United States Patent [19]
Tanaka

[11] Patent Number: 6,125,277
[45] Date of Patent: *Sep. 26, 2000

[54] CORDLESS TELEPHONE CONTAINING A PROTOCOL CONVERTING CIRCUIT TO CONNECT TO DIGITAL EXCHANGES HAVING DIFFERENT PROTOCOLS

[75] Inventor: Kiyoshi Tanaka, Chiba-ken, Japan

[73] Assignee: Uniden Corporation, Chiba, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/906,592

[22] Filed: Aug. 5, 1997

Related U.S. Application Data

[63] Continuation of application No. 08/754,106, Nov. 21, 1996, abandoned, which is a continuation of application No. 08/353,313, Dec. 5, 1994, abandoned.

[30] Foreign Application Priority Data

Sep. 8, 1994 [JP] Japan .................................. 6-214612

[51] Int. Cl.[7] .............................. H04L 12/66; H04J 3/00; H04Q 7/24
[52] U.S. Cl. ......................... 455/436; 455/411; 455/410; 455/426; 455/31.2; 370/354; 370/280
[58] Field of Search ..................................... 455/436, 413, 455/410, 449, 31.2, 411, 74.1; 370/280, 354

[56] References Cited

U.S. PATENT DOCUMENTS

| | | | |
|---|---|---|---|
| 4,592,048 | 5/1986 | Beckner et al. | 370/60 |
| 5,010,565 | 4/1991 | Nash et al. | 379/61 |
| 5,212,684 | 5/1993 | Mac Namee et al. | 370/24 |
| 5,274,694 | 12/1993 | Lechner et al. | 379/63 |
| 5,278,890 | 1/1994 | Beeson, Jr. et al. | 379/57 |
| 5,303,287 | 4/1994 | Laborde | 379/59 |
| 5,309,501 | 5/1994 | Kozik et al. | 379/58 |
| 5,329,573 | 7/1994 | Chang et al. | 379/58 |
| 5,384,826 | 1/1995 | Amitay | 379/60 |

FOREIGN PATENT DOCUMENTS

| | | |
|---|---|---|
| 51-803 | 1/1976 | Japan . |
| 51-402 | 8/1976 | Japan . |
| 2-223261 | 2/1989 | Japan . |
| 2-92045 | 3/1990 | Japan . |
| 4-70021 | 3/1990 | Japan . |
| 6-21885 | 6/1994 | Japan . |
| 2245454 | 1/1992 | United Kingdom . |
| 2245455 | 1/1992 | United Kingdom . |

OTHER PUBLICATIONS

Duplessis & Maillard, "Pan–European Digital Cellular System for Mobile Telephones", Commutation & Transmission #2, Feb. 1988.
Goodman, "Trends in Cellular and Cordless Communications", IEEE Communication Magazine, Jun. 1991.

*Primary Examiner*—William Cumming
*Attorney, Agent, or Firm*—Fish & Richardson P.C.

[57] ABSTRACT

There is provided a cordless telephone which can be connected to any one of digital exchanges of different protocols. A main unit of the cordless telephone is provided with a memory for storing a table for collating control data (first control data) defined by the protocol of a digital exchange to be connected and control data (second control data) inherent to the cordless telephone. The main unit also includes a protocol converting circuit 4 for conversion between the first control data and the second control data. If the cordless telephone is to be connected to another digital exchange structured in a different protocol, a protocol circuit 4 corresponding to the protocol of the digital exchange is used. Transfer of conversation between the cordless telephone and a fixed telephone can also be realized by providing a data distributing and combining circuit.

2 Claims, 5 Drawing Sheets

CORDLESS TELEPHONE CONTAINING A PROTOCOL CONVERTING CIRCUIT TO CONNECT TO DIGITAL EXCHANGES HAVING DIFFERENT PROTOCOLS

This application is a continuation of U.S. application Ser. No. 754,106, filed Nov. 21, 1996, now abandoned, which is a continuation of U.S. application Ser. No. 08/353,313, filed Dec. 5, 1994, now abandoned.

BACKGROUND OF THE INVENTION:

1. Field of the Invention

The present invention relates to a cordless telephone which can be connected, with a simple circuit modification, to various digital exchanges of different protocols. Disclosure No. 357466 regarding the present invention has been accepted by the U.S. Patent and Trademark Office.

2. Description of the Prior Art

A digital PBX installed at a node of a business information communication network is provided with a wide range of functions and is frequently referred to as an intelligent PBX (IPBX). However, protocols of such digital PBXs differ from maker to maker. For instance, a digital PBX supplied from a maker employs a line interface for alternately transmitting voice data and control data with two transmission lines for each of voice and control data, while a digital PBX supplied from another maker transmits alternately such voice data and control data with two transmission lines. Moreover, a digital PBX line for ISDN employs four transmission lines in total, two lines for transmission and two lines for reception. In addition, a signal format for signals transmitted to a subscriber telephone set from a digital PBX also differ for each digital PBX. Therefore, if a digital PBX manufactured by a certain maker is installed to constitute a network, cordless telephones to be used in this network must inevitably be those exclusively used for the digital PBX. Therefore, cordless telephone makers have to provide cordless telephones corresponding to digital PBXs of different protocols. The difference in protocol of digital PBXs has prevented the utilization of cordless telephones in offices.

The above explanation can be applied not only to a digital PBX but also to the case where protocols of digital exchanges differ.

SUMMARY OF THE INVENTION

The present invention has been proposed to solve the problems described above. The present invention provides a cordless telephone which can be connected to any one of digital exchanges of different protocols by modifying as small number of circuits of a conventional cordless telephone as possible.

The also provides present invention also provides a cordless telephone which can be connected to any one of digital exchanges of different protocols by modifying as small a number of circuits of a conventional cordless telephone as possible and can transfer a conversation between the cordless telephone and a fixed telephone.

The present invention further provides a cordless telephone which can be connected to any one of digital exchanges of different protocols by modifying as small a number of circuits of a conventional cordless telephone as possible, transfer a communication between the cordless telephone and a fixed telephone and forcibly connect the fixed telephone to a trunk line when a supply voltage of a cordless telephone becomes lower than a regular voltage value.

The provides present invention a cordless telephone capable of transmitting and receiving at least control data between the cordless telephone and one of a plurality of digital exchanges in different protocols. The cordless telephone includes a protocol converting circuit for executing conversion between control data defined by the protocol of a digital exchange to be connected and control data inherent to such a cordless telephone, the protocol converting circuit being selected in correspondence with the protocol of a digital exchange to be connected.

The present invention provides a cordless telephone which can transmit and receive at least control data between the cordless telephone and one of a plurality of digital exchanges in different protocols and comprises a main unit and a sub-unit.

The main unit comprises a protocol converting circuit which comprises a memory operable to store a table for collating control data (first control data) defined by protocols of digital exchanges to be connected with control data (second control data) inherent to the cordless telephone for conducting conversion between the first control data and second control data, and a circuit which receives the second control data from the protocol converting circuit to supply to the sub-unit a signal which causes the sub-unit to perform a desired operation and also receives the second control data from the sub-unit to supply the data to the protocol converting circuit. The protocol converting circuit is selected in correspondence with the protocol of a digital exchange to be connected.

The cordless telephone may further comprise, as required, a data transmitting and receiving circuit which operates to extract and supply control data to the protocol converting circuit and receive and supply control data received from the protocol converting circuit to the digital exchange, thereby enabling connection of the cordless telephone with interface wires the number of which is defined by the protocol of the digital exchange. The data transmitting and receiving circuit is selected in correspondence with the number of interface wires accommodated in a digital exchange to be connected.

The present invention further comprise;

a distributing and combining circuit for distributing the first control data and voice data fed from the digital exchange to the cordless telephone and a fixed telephone and for supplying the first control data and voice data fed from the cordless telephone and the fixed telephone to the digital exchange, and a circuit for transferring a conversation between the cordless telephone and the fixed telephone.

The present invention also provides the cordless telephone with a voltage monitoring circuit for monitoring a voltage supplied to the main unit and to forcibly connect the fixed telephone to the digital exchange if the voltage becomes lower than a predetermined voltage.

The protocol converting circuit executes conversion between the first control data and the second control data using a memory storing a table for collating control data (first control data) defined by the protocol of a digital exchange to be connected with control data (second control data) inherent to the cordless telephone. The protocol converting circuit is replaced with another one in correspondence with the protocol of a digital exchange to be connected, whereby the cordless telephone can be connected to any one of digital exchanges of different protocols.

The above and other objects and features of the invention will become more apparent from a consideration of the

DESCRIPTION OF THE INVENTION

Figure 1:
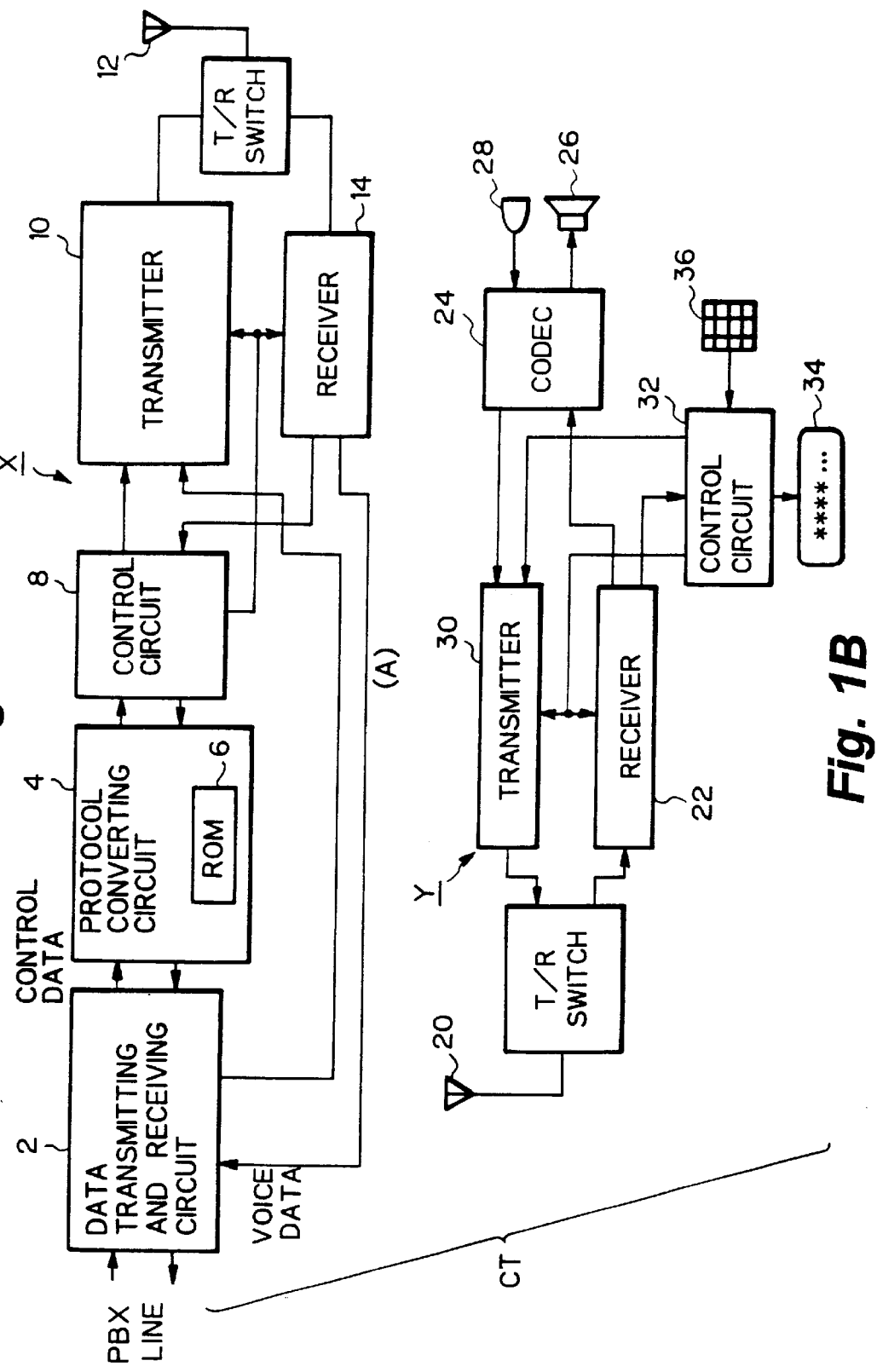
FIG. 1(A) is a block diagram schematically illustrating the configuration of an embodiment of a main unit of a cordless telephone according to the present invention.
FIG. 1(B) is a block diagram schematically illustrating the configuration of a sub-unit of a conventional cordless telephone.

FIG. 1(A) is a block diagram schematically illustrating the structure of a preferred embodiment of a main unit of a cordless telephone according to the present invention. FIG. 1(B) is a block diagram schematically illustrating the configuration of a sub-unit of a conventional cordless telephone. In FIG. 1(A), the main unit X of the cordless telephone CT transmits control data and voice data to a digital PBX via a PBX line on a time-division-multiplex basis or in a full-duplex system. Since data are transmitted between the cordless telephone CT and the digital PBX, the configuration and operation of the main unit X will be explained for each of the transmitting directions.

In the case where data are transmitted from a digital PBX to the cordless telephone CT, a data transmitting and receiving circuit 2 of the main unit X receives from the digital PBX via a PBX line voice data and control data defined by the protocol employed by the digital PBX, extracts the received voice data and control data under the control of a timing signal and sends the control data to a protocol converting circuit 4 and the voice data to a transmitter 10. Depending on the protocol employed by the PBX, the PBX line comprises two wires used for transmission and reception or four wires, two for transmission and two for reception. It is necessary, therefore, that the data transmitting and receiving circuit 2 must have a configuration corresponding to the number of interface wires of the PBX lines The protocol converting circuit 4 is provided for conversion between control data defined by the protocol employed by the digital PBX currently connected and control data inherent to the cordless telephone CT (hereinafter referred to as "inherent control data"). In order to execute such conversion, the protocol converting circuit 4 comprises a ROM 6 for storing a table indicating correspondence between the control data defined by the protocol of the currently connected digital PBX and the inherent control data. Therefore, the protocol converting circuit 4 and the ROM 6 must be changed so that they correspond to the protocol of the digital PBX to which the cordless telephone CT is to be connected. A control circuit 8, provided with control functions required by an ordinary cordless telephone, receives the inherent control data from the protocol converting circuit 4, discriminates between the received control data, starts a transmitter 10 depending on the received inherent control data and sends the control data corresponding to the inherent data and the voice data to the sub-unit Y of the cordless telephone CT via a transmission/reception circuit or switch and an antenna 12 from the transmitter 10. Therefore, the control circuit 8, transmitter 10, antenna 12, transmission/reception circuit and receiver 14 are common to a conventional cordless telephone.

The configuration of the sub-unit Y illustrated in FIG. 1(B) is well known and is not explained in detail. The reference numeral 20 designates an antenna for transmitting and receiving control data and voice data to/from the main unit X; 22 a receiver for receiving a signal from the antenna 20 and demodulates it to separately extracts encoded control data and voice data; 24 a code for decoding the voice data from the receiver 22 to reproduce a received signal from a loud speaker 26 and for encoding a sound applied to a microphone 28 to send an encoded sound signal to a transmitter 30 for modulating the encoded sound signal to transmit the signal from the antenna 20; and 32 a control circuit for controlling operations of the receiver 22 and the transmitter 30, controlling transmission and reception of a call by receiving the control data from the receiver 22, causing a display device 34 to display received display data, and supplying control data inputted from a key pad 36 to the transmitter 30 and displaying the control data on the display device 34.

In the case where data are transmitted to the digital PBX from the cordless telephone CT, control data and voice data (these data are encoded by the code) transmitted from the sub-unit Y are modulated by the transmitter 30 and then transmitted as an electric wave from the antenna 20. The electric wave is then received by the antenna 12 of the main unit X and is then supplied to the receiver 14. The receiver 14 decodes the received control data and voice data and separately extracts the control data and the voice data. The extracted control data are sent as inherent control data to the protocol converting circuit 4 through the control circuit 8. Meanwhile, the voice data from the receiver 14 are sent to the data transmitting and receiving circuit 2. Using the table stored in the ROM 6, the protocol converting circuit 4 converts the inherent control data given from the control circuit 8 into control data defined by the protocol of the digital PBX. Thereafter, the data transmitting and receiving circuit 2 sends the control data converted by the protocol converting circuit 4 and the voice data supplied by the receiver 14 to the PBX line.

As will be understood from the above explanation, the cordless telephone CT can be connected to various digital PBXs of different protocols by providing, for each digital PBX of every different protocol, a protocol converting circuit which incorporates a ROM storing a table for the collation between control data defined by the protocol of the digital PBX to which the cordless telephone CT is to be connected and control data inherent to the cordless telephone CT as well as a data transmitting and receiving circuit which has a configuration corresponding to the number of digital PBX lines and transmits and receives control data and voice data, the protocol converting circuit and the data transmitting and receiving circuit being selected in correspondence with the digital PBX to be connected.

Figure 2:
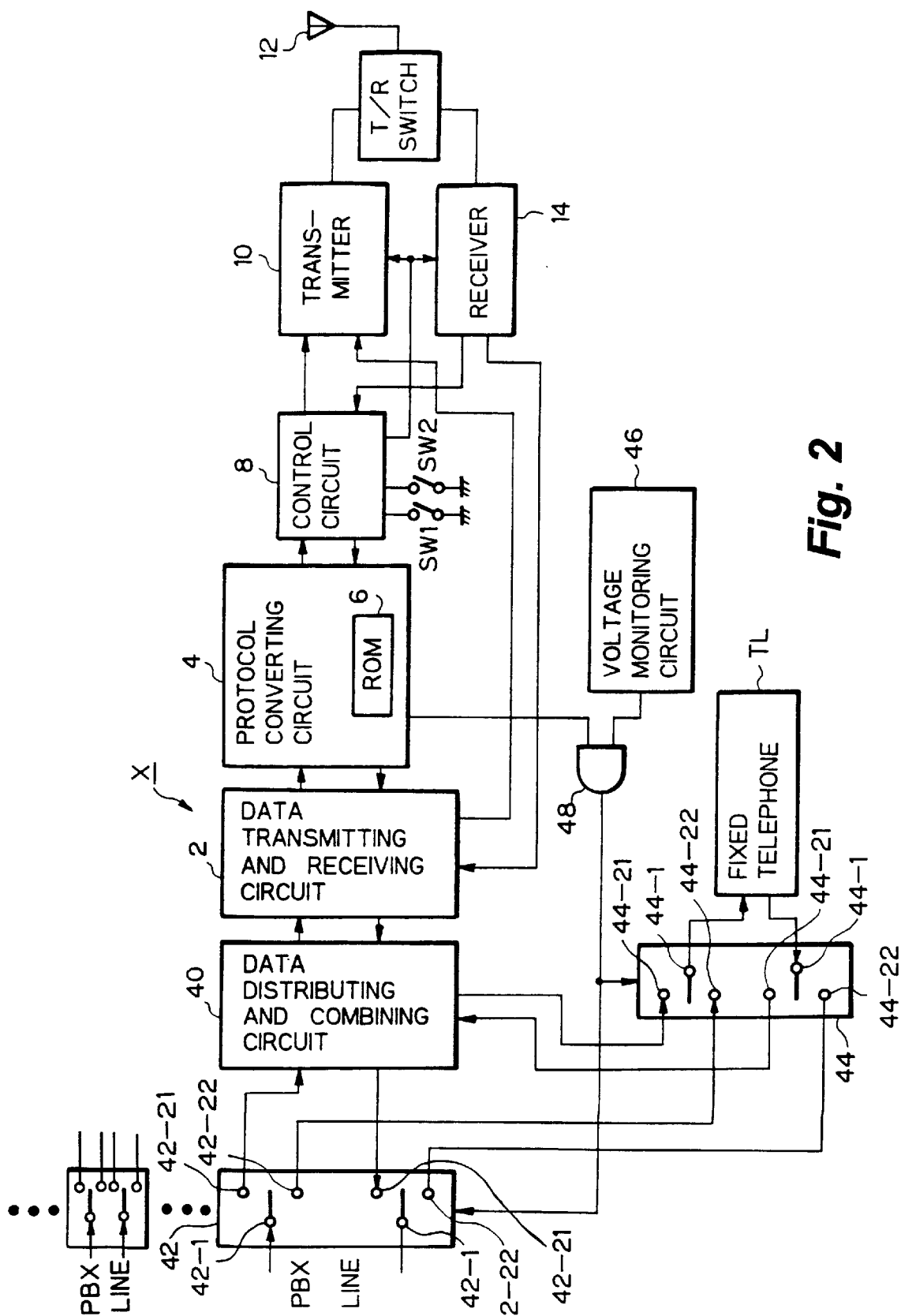
FIG. 2 is a block diagram schematically illustrating the configuration of another embodiment of a main unit of a cordless telephone according to the present invention.

FIG. 2 is a block diagram illustrating another embodiment of the main unit of a cordless telephone CT according to the present invention. According to this embodiment, a conversation can be transferred between a fixed telephone and a cordless telephone CT of the present invention, thereby realizing a system for enabling a call to be made from either the cordless telephone set CT or the fixed telephone. In FIG. 2, structural elements similar to those shown in FIG. 1(A) are designated by the same reference numerals and are not repeatedly explained here.

In FIG. 2, a data distributing and combining circuit 40, provided between a PBX line and a data transmitting and receiving circuit 2, distributes to the main unit X and a fixed telephone TL control data and voice data received from the PBX line and defined by the protocol of the digital PBX and transmits to the PBX line control data and voice data sent from the main unit X or the fixed telephone TL. A first relay 42 is provided between the PBX line and data distributing and combining circuit 40 in order to selectively connect the PBX line to the main unit X or to the fixed telephone TL. In this embodiment, since the PBX line has two wires used both for transmission and reception, a pair of moving contacts 42-1 of the first relay 42 are connected to the PBX line, while a first pair of stationary contacts 42-21 of the relay 42 is connected to the data distributing and combining circuit 40.

On the other hand, a second pair of stationary contacts 42-22 of the relay 42 and the data distributing and combining circuit 40 are connected to the fixed telephone TL via a second relay 44. Specifically, a pair of moving contact 44-1 of the second relay 44 is connected to the fixed telephone TL, a first pair of stationary contacts 44-21 of the relay 44 is connected to the data distributing and combining circuit 40, a second pair of stationary contacts 44-22 of the relay 44 is connected to the second pair of stationary contacts 42-22 of the relay 42.

Moreover, in this embodiment, a voltage monitoring circuit 46 is provided for monitoring whether a regular voltage is supplied or not from a power supply (not shown) to the main unit X. When the regular voltage is supplied, the voltage monitoring circuit 46 outputs a logical "1" signal to one input of an AND circuit 48. Meanwhile the protocol converting circuit 4 usually outputs a logical "1" signal to the other input of the AND circuit 48. Thus, the AND circuit 48 generally supplies a logical "1" signal to the first relay 42 and the second relay 44, whereby the moving contacts 42-1 are connected to the first pair of stationary contacts 42-21 in the first relay 42 and the moving contacts 44-1 are connected to the first pair of stationary contacts 44-21 in the second relay 44. However, if the voltage supplied to the main unit X becomes lower than the regular voltage, the voltage monitoring circuit 46 outputs a logical "0" signal to the AND circuit 48 thereby setting the output of the AND circuit 48 to a logical "0". Therefore, the moving contacts 42-1, 44-1 of the first and second relays 42, 44 are respectively connected to the second pair of stationary contacts 42-22, 44-22 and the PBX line is forcibly connected to the fixed telephone TL.

Two switches SW-1, SW-2 are connected between the control circuit 8 and the ground. The switch SW-1 is operated for transferring a conversation from the cordless telephone CT to the fixed telephone TL. When the switch SW-1 is closed, the control circuit 8 judges that an instruction is issued to transfer a conversation to the fixed telephone TL from the cordless telephone CT, and sends control data to the protocol converting circuit 4. Upon reception of the control data, the converting circuit 4 sends a logical "0" signal to the AND circuit 48 to set the output of the AND circuit 48 to a logical "0". Then, the moving contacts 42-1, 44-1 of the first and second relays 42, 44 are respectively connected to the second pair of stationary contacts 42-22, 44-22 whereby the conversation conducted by the cordless telephone CT is transferred to the fixed telephone TL. Meanwhile, the switch SW-2 is operated for transferring a conversation from the fixed telephone TL to the cordless telephone CT. When the switch SW-2 is closed, the control circuit 8 judges that an instruction is issued to transfer a conversation to the cordless telephone CT from the fixed telephone TL, and enables a conversation with the sub-unit Y. In this case, a signal sent to the AND circuit 48 from the protocol converting circuit 4 is in a logical "1" state and the contacts are not switched over at the first and second relays 42, 44.

When the switches SW-1, SW-2 are operated for transferring a conversation to the fixed telephone TL from the cordless telephone CT and to the cordless telephone CT from the fixed telephone TL, control data required for such transfer operations are transmitted between the main unit X, the fixed telephone TL and the sub-unit Y. For instance, when the switch SW-1 is operated to instruct the transfer of conversation to the fixed telephone TL from the cordless telephone CT, such control data are transmitted to the fixed telephone TL from the main unit X as to operate the fixed telephone TL in a manner where a call was received by the fixed telephone TL, and when the switch SW-2 is operated, the control circuit 8 sends control data which sets the fixed telephone TL in a reserved state.

Alternatively, the moving contacts of the first and second relays 42, 44 may be usually connected to the first pair of the stationary contacts. When the fixed telephone TL responds to a call, this response is detected by the protocol converting circuit 4 which outputs a logical "0" signal to the AND circuit 48. Then, the output of the AND circuit 48 turns to logical "0" whereby the moving contacts of the relays 42, 44 are moved to the second pair of the stationary contacts. In this case, when the switch SW-2 is closed to transfer a conversation to the cordless telephone from the fixed telephone TL, the control circuit 8 sends control data to the protocol converting circuit 4 which outputs a logical "1" signal to the AND circuit 48 and thereby sets the output of the AND circuit 48 to a logical "1" state to move the moving contacts of the relays 42, 44 to the first pair of the stationary contacts.

Figure 3:
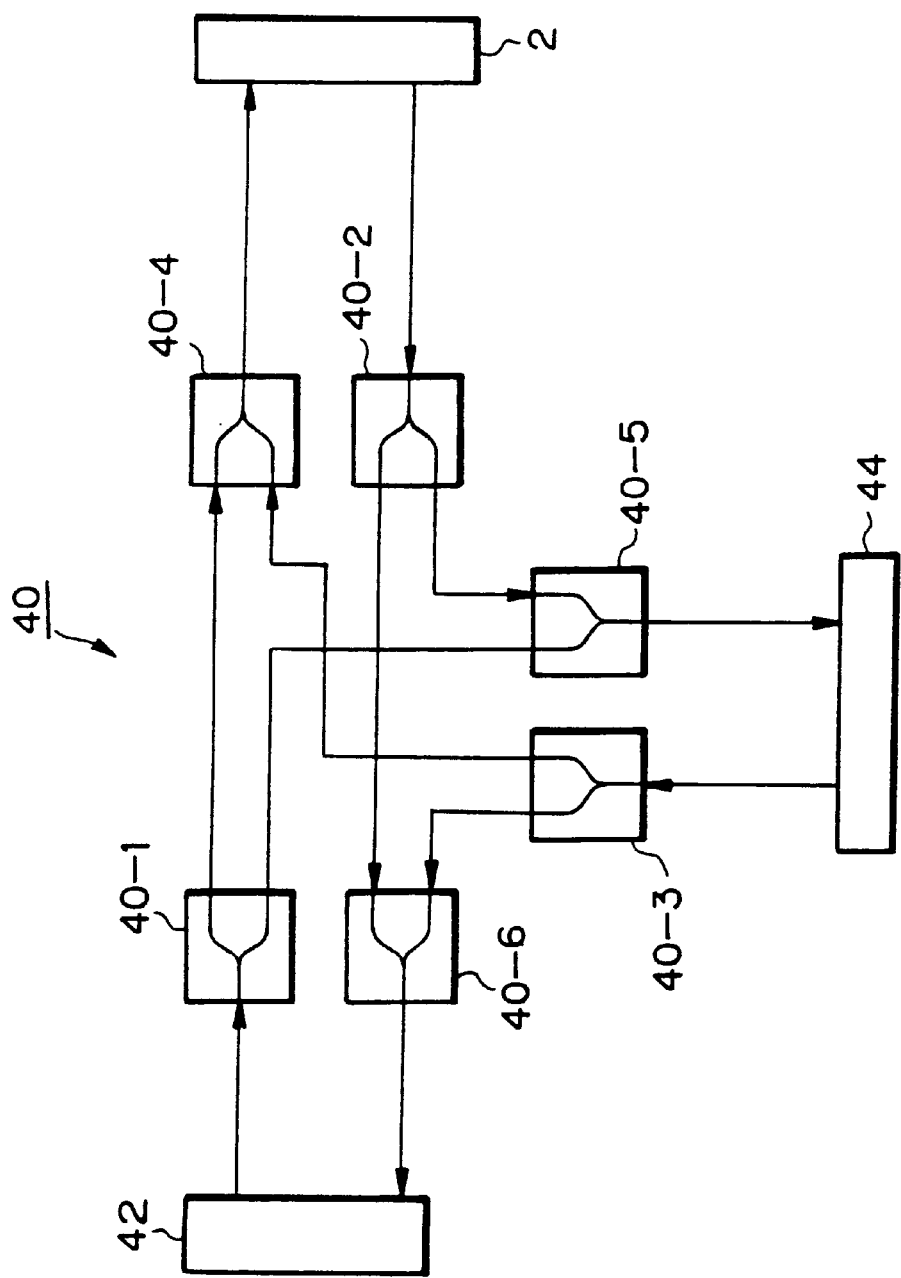
FIG. 3 is a block diagram of a practical configuration of the data distributing and combining circuit in the embodiment illustrated in FIG. 2.

Next, practical configurations of the data distributing and combining circuit 40, the data transmitting and receiving circuit 2 and the protocol converting circuit 4 used in the above-explained embodiment shown in FIG. 2 will be explained in further detail. Explanations about the data transmitting and receiving circuit 2 and the converting circuit 4 may also be applied to the embodiment shown in FIG. 1(A). FIG. 3 is a block diagram schematically illustrating an example of the configuration of the data distributing and combining circuit 40. In FIG. 3, the data distributing and combining circuit 40 comprises first to third distributing circuits 40-1, 40-2, 40-3 and first to third combining circuits 40-4, 40-5, 40-6. As illustrated in the figure, the first distributing circuit 40-1 receives data (including control data and voice data) from the PBX line through the first relay 42 and divides the received data into two parts, the second distributing circuit 40-2 receives data from the data transmitting and receiving circuit 2 and divides the received data into two parts and the third distributing circuit 40-3 receives data from the one of the first pair of the stationary contacts 44-21 of the second relay 44 and divides the received data into two parts. Moreover, the first combining circuit 40-4 combines data from the first distributing circuit 40-1 and the third distributing circuit 40-3 and supplies the combined data to the data transmitting and receiving circuit 2, the second combining circuit 40-5 combines data from the first distributing circuit 40-1 and the second distributing circuit 40-2 and supplies the combined data to the other contact of the first pair of the stationary contacts 44-21 of the relay 44 and the third combining circuit 40-6 combines data from the second distributing circuit 40-2 and the third distributing circuit 40-3 and sends the combined data to the PBX line through the relay 42.

Figure 4:
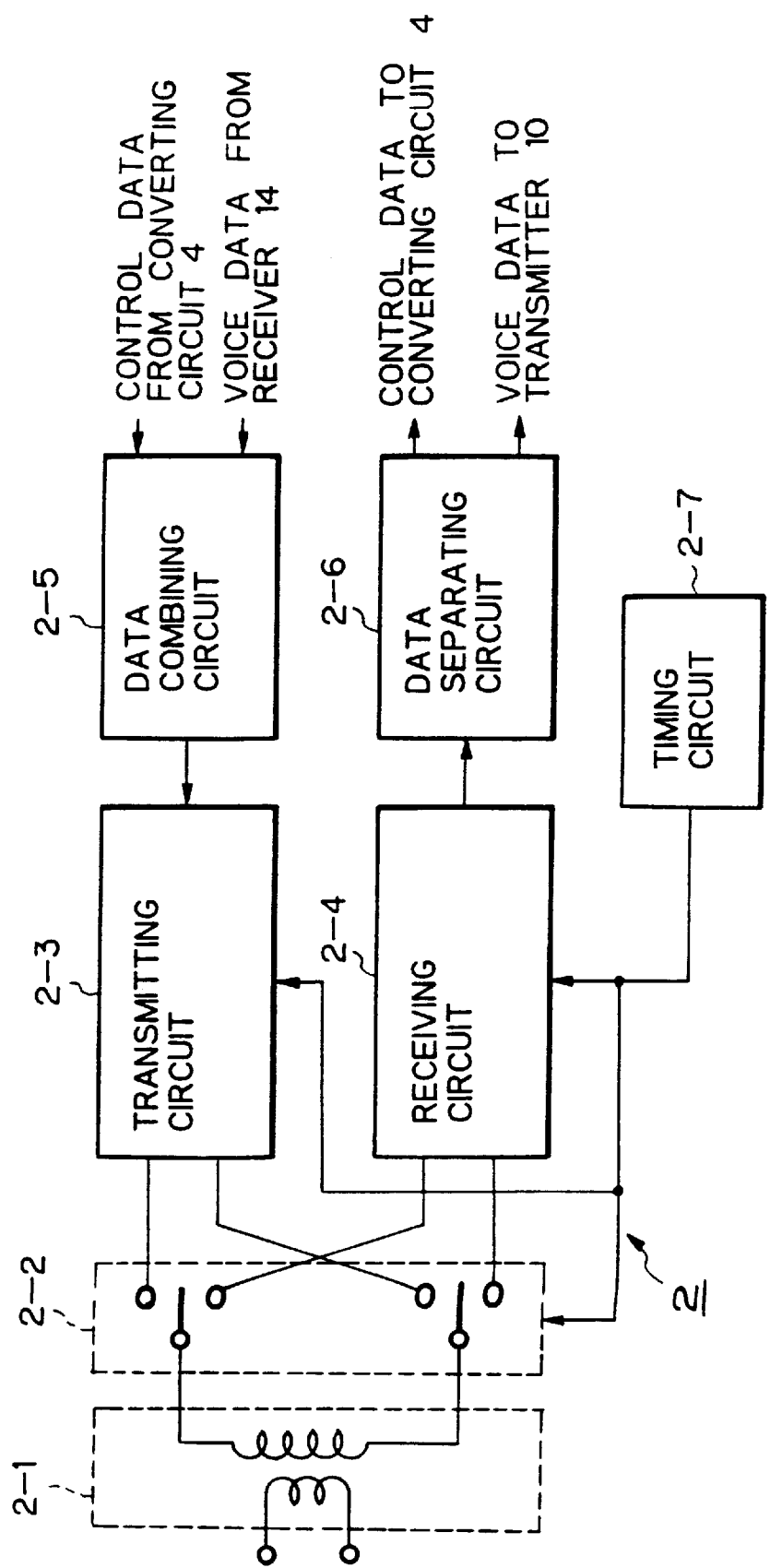
FIG. 4 is a block diagram schematically illustrating the configuration of the data transmitting and receiving circuit in the embodiment illustrated in FIG. 1(A) and FIG. 2.

FIG. 4 is a block diagram schematically illustrating an example of a practical configuration of the data transmitting and receiving circuit 2 used in the system where the PBX line has two wires. As illustrated in FIG. 4, the data transmitting and receiving circuit 2 is provided with an input/output circuit 2-1 for transmitting and receiving data to and from the PBX line (FIG. 1) or the data distributing and combining circuit 40 (FIG. 2). The input/output circuit 2-1 is connected to a transmitting circuit 2-3 or a receiving circuit 2-4 through a changeover switch 2-2. The transmitting circuit 2-3 receives data from a data combining circuit 2-5 for combining control data from the protocol converting circuit 4 and voice data from the receiver 14. On the other hand, the receiving circuit 2-4 sends data from the PBX line or the data distributing and combining circuit 40 to a data separating circuit 2-6 to separate the data into control data to be sent to the protocol converting circuit 4 and voice data to be sent to the transmitter 10. The changeover operation of the changeover switch 2-2 is controlled by a timing pulse from a timing circuit 2-7, and the transmitting circuit 2-3 and the receiving circuit 2-4 operates in synchronism with the changeover operation in which the changeover switch 2-2 moves between the transmitting circuit 2-3 and the receiving circuit 2-4.

When the PBX line comprises two wires for transmission and two wires for reception, the changeover switch 2-2 is unnecessary, and the transmitting wires and the receiving wires are connected to the transmitter and the receiver, respectively, through the input/output circuit.

Figure 5:
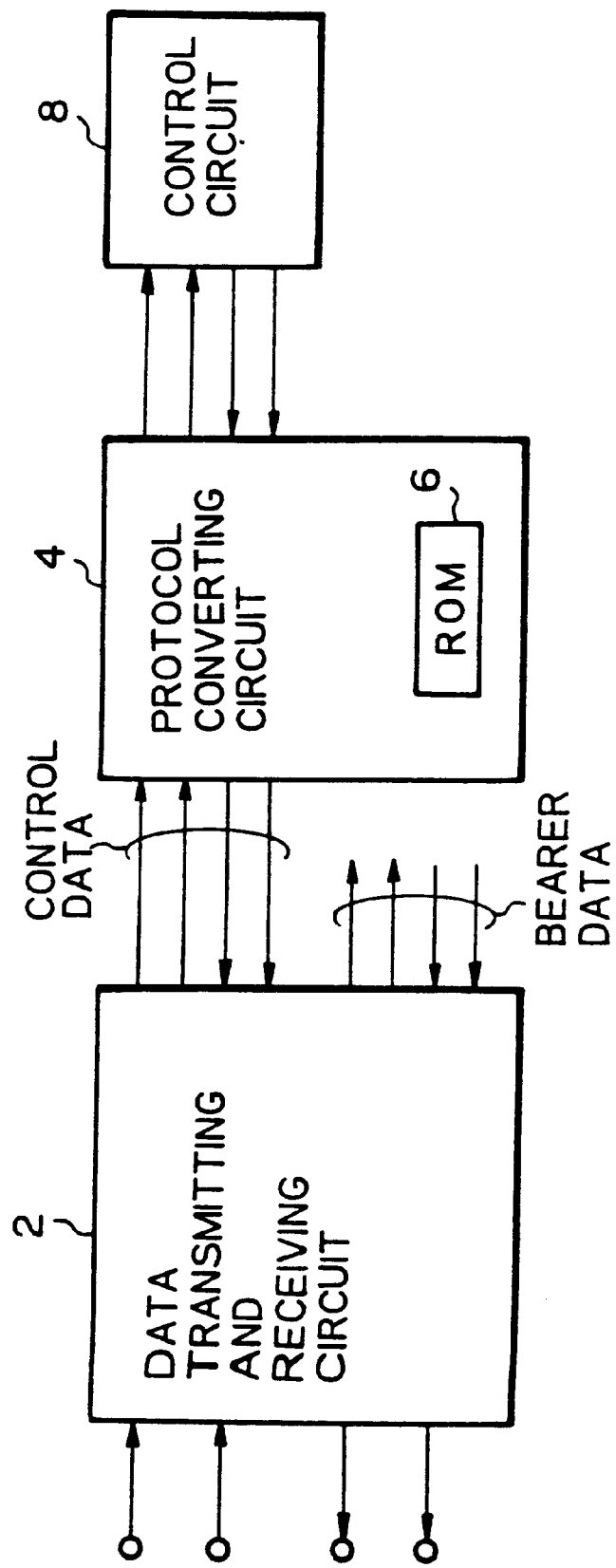
FIG. 5 is used for explaining the operation of the protocol converting circuit in the embodiment illustrated in FIG. 1(A) and FIG. 2.

In the ISDN, data transmission and reception are carried out between a digital exchange and each cordless telephone using four wires. It is hereafter explained how protocol is processed in correspondence to the digital PBX in the data transmitting and receiving circuit 2 and how control data are converted using the ROM 6 in the protocol converting circuit 4, taking as an example the case where the cordless telephone CT of the present invention is connected to the PBX having an ISDN line interface. FIG. 5 schematically illustrates how the data transmitting and receiving circuit 2, the protocol converting circuit 4 and the control circuit 8 are connected in this case. Control data and voice data transmitted between the digital PBX and the cordless telephone CT through two pairs of wires take the form of bipolar signals having any one of three values of +E, 0 and −E. Actually, these data and various codes form a frame. Therefore, the receiving circuit 2-4 of the data transmitting and receiving circuit 2 converts three-valued control data and voice data sent from the digital PBX through two pair lines into two-valued control data (D channel) and bearer data (B channel), separately extracts these data and sends the two-valued control data to the protocol converting circuit 4 and the two-valued bearer data to the transmitter 10. The transmitting circuit 2-3 combines two-valued control data from the protocol converting circuit 4 and two-valued bearer data from the receiver 14, converts the combined data into three-valued data and sends the data to two wires of the PBX line.

As is well known, the ISDN User Network Interface Protocol has a structural architecture comprising three layers, layer 1 to layer 3. The layer 1 specifies electrical and physical conditions, the layer 2 specifies link setting and error control for message transfer and the layer 3 specifies functions of call control including call establishment and release and control for additional services. Control data are transmitted in a frame format defined by the layer 2 and the information field thereof includes a layer 3 message. Layer 3 messages serve to send information about call, answer and disconnection. The protocol converting circuit 4 extracts a layer 3 message, that is, the converting circuit 4 extracts a frame part in the layer 2 from layer 1 data sequence and then extracts a layer 3 message in order to obtain necessary information. A message obtained as explained above is converted to the inherent control data using the table stored in the ROM 6. For instance, message types corresponding to such three messages as SETUP (request for call setup), CONNect (notification that a called party answers), DISconnect (call disconnection request) in the layer 3 of the ISDN are as follows:

| Layer 3 Message | Message Type |
|---|---|
| SETUP | 00000101 |
| CONNect | 00000111 |
| DISconnect | 01000101 |

Therefore, in the present invention, the ROM 6 has stored such a table for collating the message types of layer 3 messages with the inherent control data as indicated in the following table:

| Layer 3 Message | Message Type | Inherent Control Data |
|---|---|---|
| SETUP | 00000101 | 10000111 |
| CONNect | 00000111 | 10001011 |
| DISconnect | 01000101 | 10001100 |

If the message SETUP "100000101", for instance, is inputted to the protocol converting circuit 4 of the main unit X from the PBX line, the protocol converting circuit 4 converts the message "00000101" into "10000111" using the table stored in the ROM 6 and supplies the converted message to the control circuit 8. Then, the control circuit 8 judges from the supplied message "10000111" that "SETUP", a request for call setup, has been issued and starts the transmitter 10, thereby sending call arrival information to the sub-unit Y. Specifically, a transmitting frequency is set in the transmitter 10, vacant channel information is given from the receiver 14 to the transmitter 10 and the call arrival information and an ID number of the sub-unit Y are transmitted to the sub-unit Y using the vacant channel.

In the case of initiating a call, the sub-unit Y sends both call initiation information and an ID number of the main unit X to the main unit X. The receiver 14 of the main unit X demodulates the signals from the sub-unit Y and supplies the demodulated signals to the control circuit 8. The control circuit 8 sends the message "10000111" indicating a request for call setup to the protocol converting circuit 4 if the control circuit 8 confirms that the ID number sent from the sub-unit Y matches with the ID number of the main unit X. The protocol converting circuit 4 converts the message "10000111" into the message "00000101" using the table stored in the ROM 6 and sends the message "00000101" to the data transmitting and receiving circuit 2 which in turn sends the control data to the digital PBX in the form of three-valued data corresponding to the protocol of the ISDN.

The present invention has been described in regard to the configuration which makes it possible to connect a cordless telephone to digital PBXs various protocols, but the present invention can be applied for connecting a cordless telephone not only to digital PBXs but also to conventional digital exchanges of different protocols.

As can be understood from the above description, the present invention is advantageous in that a cordless telephone can be connected to digital exchanges of different protocols. This may be accomplished by providing (1) protocol converting circuits each comprising a ROM storing a table for collating control data specified by the protocol of a digital exchange to which the cordless telephone is to be connected with control data inherent to the cordless telephone and (2) transmitting and receiving circuits each having the configuration corresponding to the number of interface lines accommodated in the digital exchange to transmit control data and voice data between the digital exchange and the cordless telephone and by selecting a protocol converting circuit and a data transmitting and receiving circuit in correspondence to the digital exchange to be connected.

Moreover, the present invention provides a distributing and combining circuit and a switch for instructing a control circuit to transfer conversation to a fixed telephone, whereby conversation through the cordless telephone or the fixed telephone is not only possible but also conversation can be transferred between the cordless telephone and the fixed telephone. In addition, a voltage monitoring circuit is provided to assure conversation through the fixed telephone even if a supply voltage becomes lower than a regular voltage and conversation through the cordless telephone becomes impossible.

What is claimed is:

1. A cordless telephone for transmitting and receiving at least control data between said cordless telephone and any one of a plurality of digital exchanges structured in different protocols, said cordless telephone comprising a main unit and a sub-unit, said main unit comprising:

a protocol converting circuit comprising a memory operable to store a table for collating a first control data defined by protocols of digital exchanges to be connected with a second control data of said cordless telephone for conducting conversion between the first control data and the second control data;

a circuit for receiving the second control data from said protocol converting circuit to supply to said sub-unit a signal which causes said sub-unit to perform a desired operation and for receiving the second control data from said sub-unit to supply the data to said protocol converting circuit, said protocol converting circuit being selected in correspondence with the protocol of a digital exchange to be connected;

a distributing and combining circuit for distributing the first control data and voice data fed from said digital exchange to said cordless telephone;

a fixed telephone for supplying the first control data and voice data fed from the cordless telephone and the fixed telephone to the digital exchange;

a circuit for transferring a conversation between the cordless telephone and the fixed telephone; and a voltage monitoring circuit for monitoring a voltage supplied to said main unit to forcibly connect said fixed telephone to said digital exchange if said voltage becomes lower than a predetermined voltage.

2. A cordless telephone for transmitting and receiving at least control data between said cordless telephone and any one of a plurality of digital exchanges structured in different protocols, said cordless telephone comprising a main unit and a sub-unit, said main unit comprising:

a protocol converting circuit comprising a memory operable to store a table for collating a first control data defined by protocols of digital exchanges to be connected with a second control data of said cordless telephone for conducting conversion between the first control data and the second control data;

a circuit for receiving the second control data from said protocol converting circuit to supply to said sub-unit a signal which causes said sub-unit to perform a desired operation and for receiving the second control data from said sub-unit to supply the data to said protocol converting circuit, said protocol converting circuit being selected in correspondence with the protocol of a digital exchange to be connected, a data transmitting and receiving circuit operable to extract and supply control data to said protocol converting circuit and receive control data from said protocol converting circuit and supply said control data to said digital exchange, thereby enabling connection of said cordless telephone with interface wires the number of which is defined by the protocol of said digital exchange, said data transmitting and receiving circuit being selected in corresponding with the number of interface wires accommodated in a digital exchange to be connected;

a distributing and combining circuit for distributing the first control data and voice data fed from the digital exchange to the cordless telephone;

a fixed telephone for supplying the first control data and voice data fed from the cordless telephone and the fixed telephone to said digital exchange;

a circuit for transferring a conversation between the cordless telephone and the fixed telephone; and a voltage monitoring circuit for monitoring a voltage supplied to the main unit to forcibly connect the fixed telephone to said digital exchange if said voltage becomes lower than a predetermined voltage.

* * * * *